United States Patent [19]

Merkl

[11] 4,317,487

[45] Mar. 2, 1982

[54] METHOD OF RECOVERING OIL AND OTHER HYDROCARBON VALUES FROM SUBTERRANEAN FORMATIONS

[75] Inventor: George G. Merkl, Haworth, N.J.

[73] Assignee: Molecular Energy Research Company, Inc., Houston, Tex.

[21] Appl. No.: 56,441

[22] Filed: Jul. 13, 1979

Related U.S. Application Data

[63] Continuation-in-part of Ser. No. 934,509, Aug. 17, 1978, abandoned.

[51] Int. Cl.³ .................... E21B 43/18; E21B 43/22
[52] U.S. Cl. ........................ 166/305 R; 166/252; 166/275; 166/308; 252/8.55 R; 252/8.55 D; 252/358
[58] Field of Search ............... 166/273, 274, 275, 279, 166/300, 305 R; 252/8.55 R, 8.55 D

[56] References Cited

U.S. PATENT DOCUMENTS

| | | | |
|---|---|---|---|
| 1,351,945 | 9/1920 | Dulany | 166/300 |
| 2,748,867 | 6/1956 | Lissant | 252/8.55 R X |
| 2,872,982 | 2/1959 | Wade | 166/300 |
| 3,386,511 | 6/1968 | Messina | 166/300 |
| 3,833,718 | 9/1974 | Reed et al. | 252/8.55 R X |
| 3,865,435 | 2/1975 | Sareen et al. | 252/8.55 R X |
| 4,029,747 | 6/1977 | Merkl | 423/413 |
| 4,141,417 | 2/1979 | Schora et al. | 166/305 R |

*Primary Examiner*—Stephen J. Novosad
*Assistant Examiner*—George A. Suchfield
*Attorney, Agent, or Firm*—Arnold, White & Durkee

[57] ABSTRACT

A method of recovering crude oil and other hydrocarbon values from a subterranean formation which comprises generating "bottom hole pressure" within the formation by introducing an aqueous solution of a polymeric complex capable of releasing active hydrogen under the temperature and pressure conditions of the formation. Preferably, the polymeric complex is an inorganic multimetal polymeric complex in which the active hydrogen is at least partially in the form of a group selected from —NH, —PH, and —SH.

14 Claims, 6 Drawing Figures

TEST SYSTEM FOR OIL SANDS

TEST SYSTEM FOR OIL SANDS

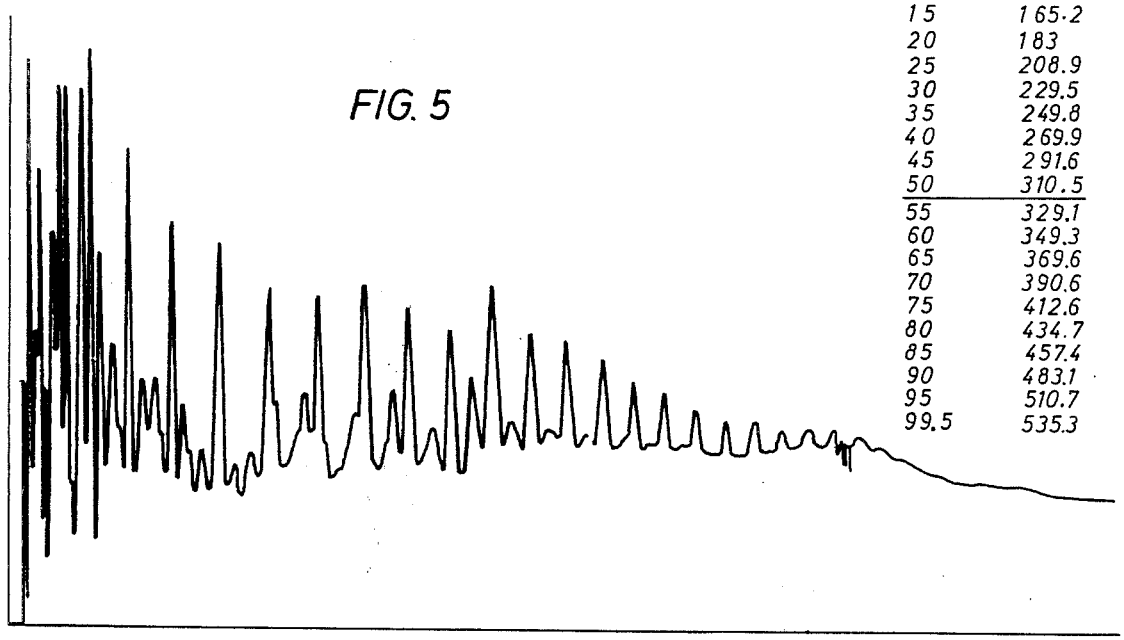
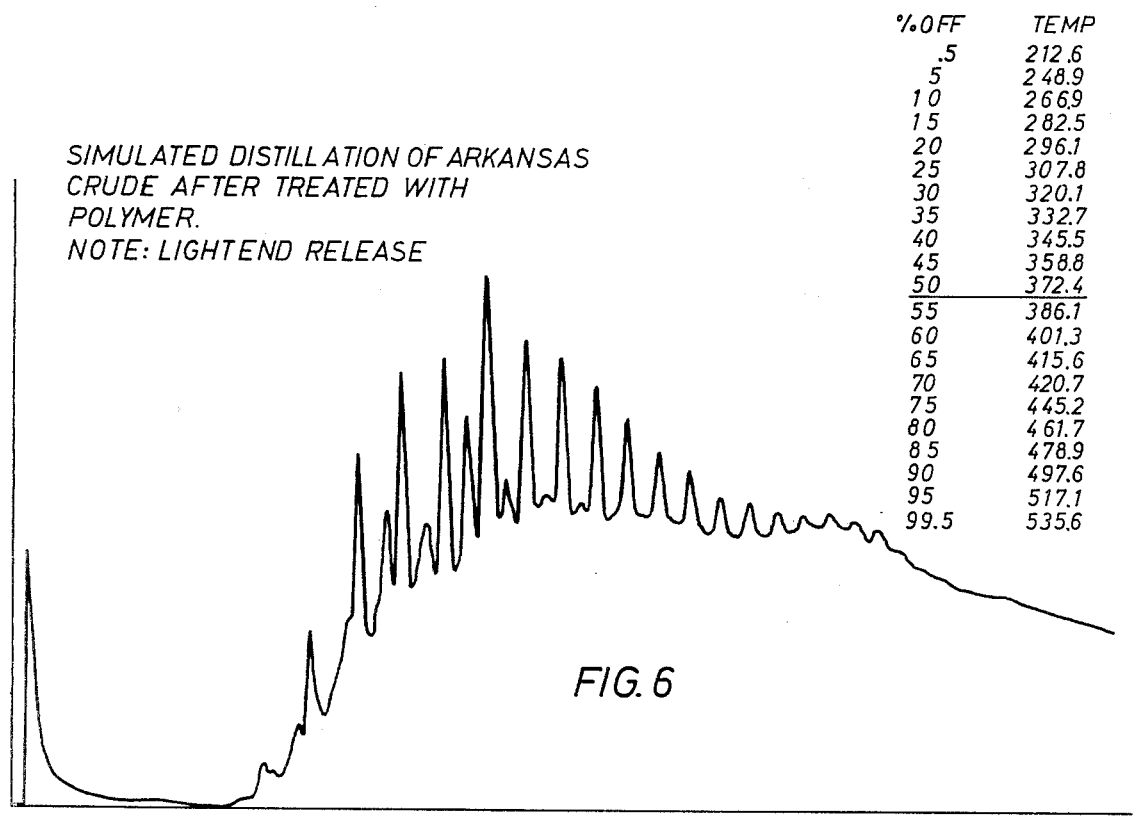

METHOD OF RECOVERING OIL AND OTHER HYDROCARBON VALUES FROM SUBTERRANEAN FORMATIONS

CROSS-REFERENCE TO RELATED APPLICATION

This application is a continuation-in-part of application Ser. No. 934,509, filed Aug. 17, 1978, abandoned.

BACKGROUND OF THE INVENTION

There are large reserves of crude oil in the United States which cannot be recovered. Most of these reserves are found in geologic formations which are considered to have been depleted. Of the 442 billion barrels of oil which have been discovered to date in the United States at various underground locations, less than 25% of the oil has actually been drawn out and about 70 to 75% of the oil has remained in place. The technology of oil recovery techniques has developed with reference to several phases, which have been termed: primary, secondary and tertiary recovery.

Primary recovery was the original method of obtaining crude oil. In general, an internal pressure existed within the oil-bearing formation which was termed "bottom hole pressure". When a well was drilled from the surface down to the formation, this internal pressure would push the oil to the surface where it could be recovered. After the original internal pressure was exhausted, techniques called secondary recovery were employed. In general, this involved pumping water into a reservoit, the so-called water flooding technique. In this way, more oil was swept towards the wells where it could be pumped to the surface. This, and a similar technique called gas flooding, have become known as secondary recovery and are known to boost a given reservoir's average yield from about 30%-50%. Getting to the remaining 50%-70% requires a method to release oil that is either too heavy to be driven by water or gas, is too diffused in the formation, or is trapped by rock and sand.

The techniques for extracting the remaining oil in various formations have come to be known as tertiary recovery. However, of the various techniques used heretofore, none has been totally acceptable or even successful. There are four principal tertiary recovery techniques, of which the most advanced is thermal recovery. In this process the viscosity of the oil is reduced sufficiently to allow it to flow to the well by actually heating the rock formation containing the oil. The heating method is principally the injection of steam into the reservoir. An alternate method consists of actually setting a fire within the formation, which heats the rock and also pushes hot gases ahead of it, causing the oil to flow. However, this method is much too expensive and is not very efficient.

Another technique is hydrocarbon miscible flooding. This method employs light hydrocarbon solvents such as kerosene and the various "dry cleaning" agents. The solvents are pumped into the reservoir, where they mix with the oil and "clean" it from the rock. Obviously, the high cost of solvents places serious limitations upon the process which, at best, is a trade-off between scarce and costly commodities.

A third technique, carbon dioxide flooding, utilizes the property of $CO_2$ which allows it to dissolve into the crude oil when it is forced into the oil reservoir under pressure. The dissolution of the $CO_2$ in the oil reduces the viscosity of the oil by a factor of 10 or more. But this system is, at this time, more of a laboratory success than a quantity producer under actual conditions, and it habors a serious drawback which centers around a shortage of $CO_2$ in this country.

The fourth technique is micellar/polymer (chemical) flooding. The micellar fluid (a solution consisting of special soaps, surfactants, alcohol, oil and water) is injected in "slug" form into the rock deposits to wash some of the oil from the rock. Then a gel-like thickening agent is introduced behind the "slug" injection to help keep the oil moving in the proper direction. This system ultimately could be useful in oil recovery, except that the surfactants are expensive, and it takes almost one year for the oil production to begin after the slug has been injected.

A primary feature of the present invention is that it enables a return to the techniques of primary and secondary oil recovery. In this invention, e.g., through the use of an active hydrogen releasing polymeric material, the crude oil in a subterranean reservoir is caused to generate and release to the formation volatile hydrocarbon gases, which results in the generation of "bottom hole pressure" in selected geological formations. This "bottom hole pressure" may then be used to recover a sizable fraction of the remaining oil in that reservoir. I have also found that I can maintain "bottom hole pressure" for fairly long periods of time, thus permitting substantial recovery of crude oil and other petroleum values from the formation.

SUMMARY OF THE INVENTION

In its broadest application, my invention is a method of enhancing the recovery of petroleum values from subterranean formations which comprises introducing into the formation an aqueous solution of a polymeric complex capable of releasing active hydrogen under the temperature and the pressure conditions existing within the formation in a manner effective to permit reaction of the active hydrogen with the petroleum values in place within the formation. More particularly, the invention is a method of creating and/or increasing the fluid pressure within a subterranean reservoir containing crude petroleum oil which comprises introducing into the reservoir an effective amount of a polymeric complex capable of releasing active hydrogen under the temperature and pressure conditions existing within the formation, whereby the active hydrogen which is released reacts with the oil to form more volatile, lower molcular weight hydrocarbons. The formation of these lower molecular weight hydrocarbons, which appears to occur through a chemical break down of the higher molecular weight hydrocarbons contained in the crude oil, results in the generation of pressure within the reservoir.

The preferred method according to the present invention involves the introduction into the reservoir and into contact with the oil within the formation of an aqueous solution of a multi-metal, inorganic polymeric complex containing releasable active hydrogen in the form of one or more groups selected from NH, PH or SH. Specific inorganic, polymeric complexes have been used according to the method of the present invention have been analyzed to consist essentially of an inorganic polymer having the following repeating structure:

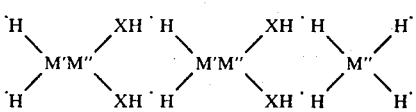

Wherein
M' is an alkali metal, and
M" is a non-alkaline metal from groups I–VIII of the periodic table, and
X is selected from nitrogen, phosphorus or sulfur.

In accordance with the invention, the inorganic polymeric complex capable of releasing active hydrogen is employed by first diluting it to an effective concentration in water and then introducing this dilute solution into contact with the oil in the formation according to suitable, well-known down hole fluid techniques. I have determined that the polymeric complex can be effective in concentrations as low as about 400 ppm by weight to as high as about 100,000 ppm. The preferred concentration will depend upon a number of variables, including the nature of the petroleum values in the field, the geological characteristics of the formation and how the petroleum values are located within the formation, whether the field has previously produced, has previously been water flooded, and the like. Generally speaking, it has been found that a concentration of between about 4,000 ppm to about 48,000 ppm will be satisfactory for most applications of the method of the invention. If the formation has any degree of permeability and porosity at all, an effective procedure will result when using a concentration of polymeric complex in the solution as low as 500 to 1,000 ppm. The more dilute the solution, the better will be the penetration obtained (in a loose formation) and very dilute solutions appear to form minimicroemulsions which have excellent penetrating characteristics. On the other hand, where the formation has a very low permeability and low porosity as well, I have determined that it may be better to employ the polymeric complex in a more concentrated solution.

Generally speaking, it is important to note that the method of the invention requires that the active hydrogen releasing polymeric solution come into direct contract with the petroleum values in the formation. Thus, the formation must contain at least some crude petroleum oil or gas in order for the method of the invention to be operative. However, as will be more thoroughly explained below, the method of the invention results in the production of substantial quantities of hydrocarbon gases as well as crude oil, even from formations which have never produced gas previously.

There are a number of different mechanisms whereby oil recovery is enhanced through inter-action of the inorganic polymeric complex with crude oil in formation according to the invention method. First of all, the polymeric complex in dilute solution functions as if it were a detergent or surfactant, releasing the crude oil from the interstices of the formation. The polymeric complex appears to adsorb onto the formation surfaces, whereby the oil agglomerates. A "lubricating" effect takes place, actually causing the observed permeability of the formation to increase. The porosity of the formation has also been observed to increase, and this is particularly true where silt is present before treatment according to the invention. In this instance, it appears that the polymeric complex interacts with the silt particles, affecting their polarity so as to cause an increased dispersion of the particles and to minimize the tendency of the particles to come together to form larger parties which tend to clog the formation pores.

Most importantly, active, atomic hydrogen released from the polymeric complex appears to react with the crude oil to produce lower molecular weight hydrocarbon products. The release of these more volatile hydrocarbons tends to produce an increased "bottom hole pressure" and resultant flow of the crude oil and gaseous products to the well. Production from the well is by primary oil recovery techniques well known to those having skill in this art and is not considered to be a part of the method of the present invention.

The products produced during the reaction of the atomic hydrogen released by the polymeric complex with the crude oil in the formation have been analyzed to comprise lower molecular weight hydrocarbons. It appears as if a "cracking" process has occurred, since analysis of the crude after treatment with the process of the invention shows that the percentages of the higher molecular weight hydrocarbons have changed (although it may be a selective cracking with not all hydrocarbon values changing). In any event, it has been observed that the actual average boiling point of the crude oil is modified upwardly as much as 30° C. following the reaction of the invention and the "release" of the lighter hydrocarbon products.

To some extent, utilization of this phenomenon of "cracking" and releasing "light ends" may assist in predicting the approximate degree of "bottom hole pressure" which can be generated according to the method of the invention. A sample of the crude taken from the well prior to treatment with the polymeric complex solution can be reacted with various concentrations of polymeric complex and the amount of gas generated observed. This, in combination with an analysis of the formation characteristics, will better enable the operator to determine a suitable amount and concentration of polymeric complex for stimulation of oil production from a particular well.

In the field, it will ordinarily be most convenient to initiate the method of the invention with about 1 to 2 barrels of a relatively concentrated solution of the inorganic polymeric complex capable of releasing active atomic hydrogen. The preferred inorganic polymeric complex, which will be more fully described below, is prepared in aqueous solution. This aqueous solution may then be diluted to the appropriate concentration at the wellhead. When the proper solution is formed, it is then pumped down the well, preferably as slowly as possible, and directly into the formation. Once the polymer solution is in place in the formation, an interim period is required during which active hydrogen released from the polymeric complex reacts with the crude oil to create "bottom hole pressure". Periods as short as 2 hours to reach measurable pressure at the wellhead have been observed, as well as up to 10 days to 2 weeks before the "bottom hole pressure" is sufficient for economical recovery of oil. When the appropriate "bottom hole pressure" has been established, then the normal techniques of oil production already known in the art can proceed.

Where the aqueous solution of inorganic polymeric complex comes into contact with brackish or saline water in the underground formation, it is often important to ensure that the divalent ions present in the brackish or saline water do not react with the inorganic polymeric complex, and in so doing inactivate it. To achieve this, a small amount of hydrogen peroxide, say up to about 5% by weight based on the weight of the inorganic polymeric complex concentrate, is added to the aqueous solution of inorganic polymeric complex. This has the effect of oxidizing or tying up the divalent ions and preventing any inactivation of the inorganic polymeric complex. Interestingly, the inorganic polymeric complex appears to stabilize the hydrogen peroxide in the system.

DESCRIPTION OF THE DRAWINGS

In the drawings:

FIGS. 5 and 6 are gas chromatographs taken for two separate samples of the same Arkansas crude oil, the sample shown in FIG. 5 being taken before treatment according to the method of the invention and the sample shown in FIG. 6 being taken after treatment.

DESCRIPTION OF PREFERRED EMBODIMENTS

The Polymeric Complexes

Figure 1:
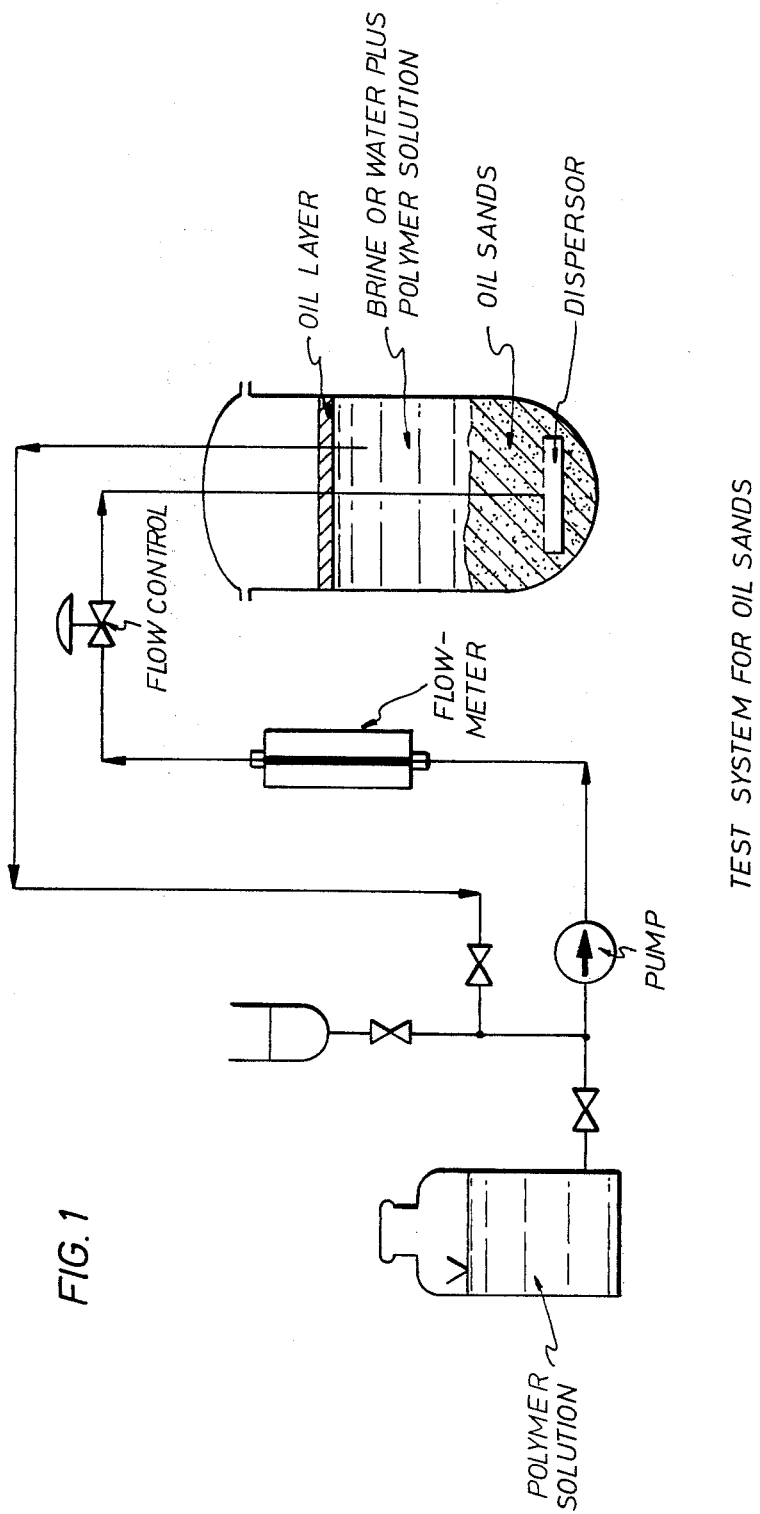
FIG. 1 is a schematic layout of a laboratory test system for studying the reaction dynamics of the invention in a simulated oil well using a fixed sand bed containing a known amount of crude oil.

The novel aspects of the present invention center around the nature of the aqueous solution which is pumped down into the petroleum-containing reservoir.

To achieve the advantages of the present invention, it is merely necessary to introduce into the subterranean formation containing the petroleum values an aqueous solution of a polymeric complex which can effectively release atomic or active hydrogen under the temperature and pressure conditions existing within the formation. Accordingly, the present invention is not limited to any particular type of polymeric complex, although some are preferred and is broadly directed to the use of any such polymeric complex which can release the active hydrogen for reaction with the petroleum values and generation of down-hole pressure as previously described. In the remainder of the specification, however, reference will be made to certain preferred polymeric complexes which have been found to be particularly useful in achieving the advantages of oil recovery in accordance with the present invention.

The preferred polymeric complexes for use in recovering petroleum values from oil fields through the generation of botton hole pressure according to the present invention are multi-metal, inorganic polymeric complexes containing releasable active hydrogen in the form of one or more groups selected from NH, PH or SH. These preferred inorganic multi-metal polymeric complexes are fully described in my earlier-filed applications identified below. Basically, they are complexes of two or more metals, at least one being a non-alkaline metal from groups I–VIII of the periodic table and another being an alkaline metal, such as sodium or potassium, bound together with hydride groups formed according to three separate chemistry systems. I refer to these materials as "polymers", distinguishing one from the other according to whether they contain nitrogen, sulfur or phosphorus hydride groups, and by the metallic elements present in the polymeric complex. For example, I would refer to a "silicon-sodium nitrogen polymer".

The nitrogen-based inorganic polymeric complexes are described in my U.S. Pat. No. 4,029,747 issued June, 1977. I also have, co-pending with the present application, applications for U.S. patent on the sulfur-based inorganic polymeric complexes (See U.S. Ser. No. 748,416, filed Dec. 8, 1976, now U.S. Pat. No. 4,117,099) and for the phosphorus-based inorganic polymeric complexes (U.S. Ser. No. 758,345, filed Jan. 10, 1977, abandoned). For purposes of fully describing the manner and methods of making these inorganic polymeric complexes, I hereby incorporate by reference the disclosures of my patent and the two applications to which I have referred. Without wishing to be bound by any particular theory, it appears that the active hydrogen (at least partially in the form of —NH, —SH or —pH groups), clearly and demonstrably contained in the inorganic polymeric complexes described and produced according to the disclosures of my patent and the two co-pending applications, is the key factor in causing both the agglomeration of oil droplets and separation from any emulsions or water mixtures as well as the release and modifications of "light ends", thus causing the generation of bottom hole pressure.

For convenience and for the sake of simplicity in making this disclosure, I have attempted to provide a single structure by which each, the nitrogen-based, sulfur-based and phosphorus-based inorganic polymeric complexes may be described. Extensive analysis continues to be applied to the task of finally and accurately describing the structure of the inorganic complexes. However, it must still be stated that to some extent, at least, the structure set forth below is speculative. However, if the methods as set forth in the disclosures incorporated above by reference to my patent and the two pending applications are followed, the appropriate preferred inorganic polymeric complexes will be prepared. Accordingly, wherever in this application the structure below is set forth to indicate an inorganic polymeric complex, it should be understood that the complex intended to be represented is one prepared according to the procedures set forth in my earlier-filed applications.

The inorganic, multi-metal polymeric complexes which I have found have the characteristics of releasing active atomic hydrogen and are preferred for use according to the method of the present invention consist essentially of polymers having the following repeating structure:

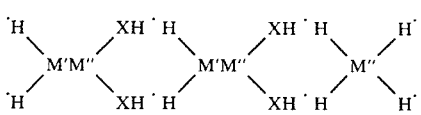

Wherein
- M' is an alkali metal, and
- M" is a non-alkaline metal from Groups I-VIII of the periodic table, and
- X is selected from either nitrogen, phosphorus or sulfur.

For reasons which will be apparent to those having ordinary skill in the art, aluminum and silicon are the preferred non-alkaline metals for use in preparing the complexes to be employed in the present invention technique, and sodium and potassium are the preferred alkaline metals. These metals will be generally compatible with the formations in which the oil is to be found and will not create any potentially harmful effects to the environment. For specialty applications and in certain formations, it may be desirable to employ an inorganic polymeric complex wherein at least a portion of the non-alkaline metal is either zinc or iron. However, for most applications, the non-alkaline metal which is clearly preferred will be silicon. Silicon appears to enhance the surfactant effect of the polymeric complexes, actually lubricates the rocks in most formations and is, generally speaking, the least expensive. In addition, as will be more fully described below, an enhanced effect is achieved in formations where silt is present, with polymeric complexes containing silicon appearing to react best.

In accordance with the present invention, it is preferred that the inorganic, multi-metal polymeric complex has a high ratio of non-alkaline metal, i.e., silicon, to alkali metal, sodium or potassium. The purpose of this high ratio is to provide additional hydride groups in the inorganic, multimetal polymeric complex. Generally, the ratio of silicon to sodium or potassium should be at least 1.4:1, with a ratio of at least 1.8:1 being preferred. The best results are achieved when the silicon/sodium or potassium ratio is 2:1 or higher, since this ratio increases the hydride content of the inorganic multi-metal polymeric complex.

With regard to the non-metallic, active-hydrogen bearing group, the preferred base chemical will depend upon a number of considerations. For example, where the formation contains a large amount of clay, nitrogen will generally be preferred. It has been found that nitrogen-based polymers move faster within the formation to break the oil/water/sand bond. On the other hand, the sulfur-based polymers appear to cause the production of more gases and are therefore useful in formations with lower light ends. The phosphorus-base polymers do not cause the release of as much gas as either the sulfur or the nitrogen-base polymers, but do provide a better penetration and a better release of the sand/oil bond than either of the other two. For this reason, the phosphorus-base polymers will be preferred in shale-containing or limestone formations and those having low permeability.

It should be apparent, therefore, that the preferred inorganic polymeric complex may be "tailor-made" to be best suited for a particular formation, petroleum pay-load, and bottom hole formation pressure. This can be done by blending, for example, a phosphorus-based polymeric complex for improved penetration with a sulfur-based polymeric complex for increased release of gases. To a certain extent, some experimentation will have to be made to determine which polymeric complex system will work best in a particular field.

Treatment Procedures

In accordance with the present invention, it has been determined that the best use of the polymeric complex is mandated by the nature of the formation which contains the residual crude oil, as well as by the size of the reservoir, the number of well-bores present, and the nature of prior treatments and chemical applications given to the oil-bearing formation during secondary and tertiary recovery stages.

For example, it has been common to treat crude-oil wells with a strong acid such as hydrochloric acid to stimulate the production flow of oil. Organic surfactants may have been used, as well as water flooding. In the latter case, the water is not pure but is a strong brine solution (containing 0.1% to 5% salt (NaCl)). Brine solution was used since it does not "plug" the formation. Fresh water causes the formation to become "plugged" due to swelling of silt thereby causing the pores within the formation to close.

I have found that a knowledge of the oil-bearing formation and the chemical conditions found underground is essential before any polymer solution can be injected into the formation. As a general rule, an environment with a relatively high pH value is essential for suitable release of active hydrogen from the polymeric complex. Most formations meet this criterion. Clay silt especially usually contains a number of compounds having reactive hydroxyl groups. This is probably the reason why the polymeric compound actually is more effective in formations containing silt. For those formations which, for one reason or another, test out to provide an environment where the pH is not as high as desired, I have found one means of effectively compensating for this is to provide a polymeric complex solution containing an amount of hydroxide containing impurities.

The nature of the injection water is important. It is preferred that the water be fresh rather than saline or brackish, that is, not to contain NaCl or divalent ions, such as calcium, magnesium or barium. It should have a neutral pH, or as close to pH 7.0 as possible. One valuable test for acceptability is to add sufficient polymeric complex to prepare a concentration of about 2,000 ppm in solution. If the solution turns "milky", indicating that the polymeric complex has precipitated from solution, then the injection water is not suitable and another source of water must be found.

The nature of the underground formation water is not so critical, and in fact, cannot be easily controlled from the surface. At least 85% of the natural waters found in depleted oil wells are saline or brackish. It is important, however, to have a reasonable estimate of the total volume of the formation water present since the concentration selected for the polymer solution will depend in part upon the amount of water present in the underground formation. For example, if there is a large amount of formation water present I have determined that it is more efficacious to add a more concentrated polymeric complex solution to compensate for the diluting effect of the formation water. In general, the volume of the formation water in relation to the volume of the polymeric complex solution will be large so that there will be a significant dilution factor after the polymeric complex solution is pumped underground. Enough polymeric complex should be added to maintain a resulting pH between 9–10. At this pH, the divalent ions will not precipitate and the polymeric complex will not break up.

When the formation does contain brackish or saline water, it is preferred in accordance with the present invention to include within the treating composition a minor amount of hydrogen peroxide. It has been found in accordance with the present invention that the addition of the hydrogen peroxide prevents the precipitation of the divalent ions in the brine or brackish water, the hydrogen peroxide appearing to oxidize the divalent ions in the formation before they can percipitate and react with the polymeric complex. While hydrogen peroxide is thought to be somewhat unstable under the conditions existing within the underground formation, it appears in accordance with the present invention that the presence of the polymeric complex stabilizes the hydrogen peroxide so that no instability or problems associated therewith results. The hydrogen peroxide is generally added to the aqueous solution of the multi-metal, inorganic polymeric complex in the form of a 30% or 50% aqueous solution. A concentration of hydrogen peroxide of up to about 5%, preferably from about 2% to 5% by weight based upon the weight of the inorganic, multi-metal polymeric complex concentrate, is effective to achieve the enhanced results desired when saline or brackish water is present in the underground formation.

The concentration of the polymeric complex solution is critical. As shown in FIG. 1, the pH is about 12.2 at high concentrations, but decreases slightly with dilution, (where concentration is expressed in parts per million) to about 4,000 ppm. At 2,000 ppm, the pH drops radically to 10.3 and at 1,000 ppm, it has dropped to 9.75. I have determined that if the pH of the polymeric complex solution drops below about pH 8.0, then the polymeric complex will precipitate from the solution, in which case it loses its effectiveness. For this reason it is important to have a knowledge of the approximate volume of the formation water locally available near the bore hole, as well as its degree of salinity, brackishness and pH.

The general procedure which should be followed to produce the best results is as follows: First, where at all possible, samples of the formation water and injection water (to be used for dilution) should be analyzed for salinity, hardness and pH. A sample of the crude oil is reacted with the polymeric complex to be employed and the simulated test products are analyzed in the laboratory by several means including infrared and gas chromatographic analysis. From these results, it is possible to predict the approximate amount of gaseous products produced by the reaction between the inorganic polymeric complex and the crude oil. This allows an estimate of the total amount of polymeric complex to be injected into the well as a function of the volume of the reservoir formation.

Logs and analyses of the well bore as a function of depth are obtained if available. If not, then they must be run to provide information concerning the nature of the formation, including its porosity and permeability, the approximate size of the reservoir, the type of underground water, oil saturation in the formation, the approximate amount of water present near the well bore and the nature of any chemicals present, used previously in secondary or tertiary recovery treatments. Also useful is a geological mapping of the field. All of this information, with the exception of the information regarding the reaction of the crude oil with the polymer complex to produce gaseous hydrocarbon products, can be obtained by standard techniques, and is well known in the prior art. In many cases, there may be up to ten (10) oil-bearing layers at various depths in the formation. In this case, it may be desirable to block off each layer in turn and to treat each layer separately.

Once the initial conditions are known in the well, then a decision needs to be made concerning the concentration of the polymeric complex solution to be injected into the formation. I have found that this depends to a great degree upon the nature of the oil-bearing formation. In general, there are two factors, porosity and permeability. Porosity is the fraction of voids for a given volume of the geological formation and permeability is its resistance to flow. Thus, one could have a high porosity but a low permeability, indicating a very large number of small holes but high resistance to flow. Permeability is the more important of the two factors and is measured in millidarcies. A low value indicates a low permeability and for this case, I have found the best way to develop "bottom hole pressure" is to inject a relatively concentrated solution, e.g., about 8,000 ppm, of polymeric complex directly into the formation. The more concentrated polymeric complex solution tends to "lubricate" the oil-bearing formation, actually descreasing the observed resistance to flow of the formation.

In cases where the permeability of the formation is relatively high, the more dilute solutions are preferred. It will be realized by those skilled in the art that selection of the most effective combination of variables for use of the polymeric complex solutions according to the present invention for enhancing recovery from a given formation will have to be developed with routine experimentation and experience. Also, with experience, the need for appropriate retreatment for continued enhanced production will be readily taken into account.

Once the proper conditions have been determined for a given well or type of formation, then the polymeric complex is diluted to a proper concentration using the following formula:

$$\text{Dilution Ratio (1:1000)} = \frac{\text{ppm desired}}{1000 \,(\text{Sp.G.}) - 1000}$$

For example, in the use of this formula, one measures the specific gravity of the polymeric complex solution before dilution. Selecting 4,000 ppm as the concentration desired for a polymeric complex with a specific gravity of 1.5, one obtains a ratio factor of 8. This means that it should take about 8 barrels of polymeric complex per 1000 barrels of dilution water to make up a treatment solution containing 4,000 ppm of the active hydrogen releasing polymeric complex. Where significant quantities of formation water are present it will be necessary to use an estimate of combined total formation water and injection water in calculating the amount of polymeric complex colution necessary for a given in situ concentration.

While the use of the higher concentration of the polymeric complex solution has the advantages enumerated above, it is often desirable in accordance with the present invention to utilize the polymeric complex solution at a lower concentration, i.e., a concentration as low as 500 ppm. In this respect, it has been found that concentrations within the range of about 500 to 1,000 ppm for the polymeric complex solution provide a minimicroemulsion, i.e., a very fine emulsion which is very effective in moving through the underground formation and displacing the oil present therein. It is interesting that at these lower concentrations, the polymeric complex solution forms this very fine emulsion, while at higher concentrations, the polymeric complex solution can effectively act as an emulsion breaker.

The polymeric complex solution, generally at ambient temperature, is pumped down the selected well using conventional equipment and procedures at a rate generally not exceeding about 3 barrels/min. In accordance with the preferred embodiment of the present invention, the polymeric complex solution should be introduced into the underground formation at a rate as slow as possible, i.e., very close to gravity-feed conditions. The polymeric complex solution is, therefore, pumped into the underground formation at a very slow rate, the pump being employed to create a small back-pressure such that the polymeric complex solution migrates and moves forward into the formation and does not back out of the formation. It has been discovered in accordance with the present invention that this slow movement and slow introduction of the polymeric complex enhances the oil recovery achieved utilizing the polymeric complex solution of the present invention by achieving the most intimate and prolonged contact between the polymeric complex solution and formation oil. Of course, after the initial introduction of the polymeric complex solution, a higher pressure can be employed with additional polymeric complex solution to achieve a pushing of the released oil. Preferably, however, the initial introduction of the polymeric complex solution should allow migration of the polymeric complex solution within the underground formation at essentially its own migration rate.

While not preferred, in some instances it may be desirable to utilize higher pressures, even to exceed the formation breakdown pressure, creating fractures which not only serve to assure better contact of the polymeric complex solution with the crude in place, but which will also improve flow back to the well. Accordingly, under these conditions, a pump having a positive displacement capacity of at least 1,200 psi should be employed. Of course, the injection well will have been previously prepared with the proper piping, expansion joints and packers, so as to ensure that the polymeric complex solution is injected properly into the oil-bearing formation. Injection technology is well known in the art and, generally speaking, the techniques to be used in the invention method will not differ from familiar techniques. Once the polymeric complex has been injected into the formation, the pump truck is disconnected and the well shut in to await development of an increased wellhead pressure.

If the polymeric complex has been injected into the formation properly, it comes into direct contact with the crude oil underground. Reaction then occurs between the active hydrogen released by the polymeric complex and at least some hydrocarbon fractions in the crude. Lighter molecular weight products are produced which tend to be more volatile, generating an increase in pressure as they are released which tends to move the oil towards the producing well. The rate of reaction producing these lighter hydrocarbons will depend somewhat upon the type of formation encountered and will also be influenced by the other variables previously discussed. I have observed lag times as short as 2–3 hours before noticeable pressure occurs at the wellhead, and in other cases it has taken as long as 30 days.

As will be recognized by those skilled in the art, the proper maintenance of well-head pressures depends upon many factors and will also influence recovery. In some cases, it is better to use one well as an injection well and to use the other wells surrounding it as producing wells. The key feature of the present invention is the generation of pressure from gases produced by chemical reaction between the active hydrogen released by the polymeric complex and the crude oil in situ. The polymeric complex apparently continues to react over prolonged periods, since I have observed increased well-head pressures which continued over several months. Pressures as high as 700 psi above normal have been observed at certain well locations over an extended period. This indicates that the polymeric complex continues to release active hydrogen to react with fresh components of the crude oil, thereby building "bottom hole pressure". This will apparently continue until the active hydrogen content within the polymeric complex begins to approach zero. Since my chemical analyses indicate that the polymeric complex may contain up to 7% of active hydrogen by weight, it will be apparent to those skilled in the art that the proper management of "bottom hole pressure" is essential to proper production of oil from depleted oil wells.

In other instances, well-head pressure has been observed to diminish relatively rapidly first but oil will continue to flow to the well and be available for recovery by standard pumping techniques. This is due to another phenomenon attributable to the method of the present invention, that is, an improvement in the permeability of the formation. The improvement in observed permeability of the formation appears to result from a combination of factors, first of all, particularly where silicon is employed as one of the metals in forming the polymeric complex utilized in the method of the present invention, formation silt deposits appear to be cleaned out. This occurs due to an actual reaction between the polymeric complex and the silt. Secondly, as has been referred to earlier, the polymeric complex functions to "lubricate" the formation sand in the nature of a surface active agent, thus in this manner lessening the resistance of the formation to flow. Finally, the electromagnetic characteristics of the active hydrogen containing polymeric complex actually tend to change the characteristics of the oil within the formation pores. The polymer appears to actually form a coating over the surface of droplets of oil, causing the droplet to "bead up" and agglomerate with other droplets similarly formed. This third effect is particularly advantageous where large amounts of water exist within the formation, as when the field has been previously water flooded. The agglomeration effect serves to separate the oil from the water and to cause it to be directed to the recovery zones.

A further preferred embodiment of the present invention comprises the addition and/or inclusion of finely divided silicon within the polymeric complex solution. I especially prefer using the "activated" silicon fines which remain in the reaction vessel after a silicon-containing complex is prepared in accordance with the procedures set forth in U.S. Pat. No. 4,029,747. These activated silicon fines appear to replenish the polymeric complex within the formation, creating even further active hydrogen for release and reaction with the crude oil in the formation and with the silt in the formation pores. Accordingly enhanced results can be achieved by employing a minor amount, for example from about 1 to 10 percent of activated silicon fines within the polymeric complex solution to be used.

Where the formation does not contain crude petroleum oil, but rather is only a natural gas reservoir, the reaction of the active hydrogen releasing polymeric complex with formation fines, such as silt, which clog the pores of the formation, is emphasized. In a low production, gas-containing formation, for example, the West Virginia shales, it has been found effective to employ relatively dilute concentrations of polymeric complex and to carry out the treating procedure in two or more repeated cycles of injection, shut in, and full open blow out. This procedure permits the silt, which has built up within the formation pores, to be blown out of the well for enhanced gas production. One such well had its production enhanced to 50,000 cfd after being treated with two drums of polymeric complex diluted with 100 drums of water, shut in until a pressure greater than 500 psi had built up at the well-head, opened up to blow out the silt, shut in again and then opened. After about 45 minutes of blowing silt, the well began to produce natural gas at 700 psi and a rate of 50,000 cfd.

Since the recovery of oil and other petroleum values in accordance with the present invention is dependent upon the release of active hydrogen, the polymeric complexes generally utilized should be those in which the active hydrogen content has been maximized. Accordingly, it is suggested, e.g., when following the procedure of applicant's U.S. Pat. No. 4,029,747 (earlier incorporated by reference) to produce a nitrogen based polymeric complex, that the polymeric complex, as it is formed, by back-diluted with ammonia water. This treatment with ammonia water will tend to increase the NH group content of the resultant polymeric complex and to maintain hydride stability by assuring that the pH remains above about 11.5, thus making more active hydrogen available for reaction with the crude oil. In general, I have found that techniques which develop a longer exotherm in producing the preferred inorganic polymeric complexes will increase the active hydrogen content of the polymeric complex.

Figure 2:
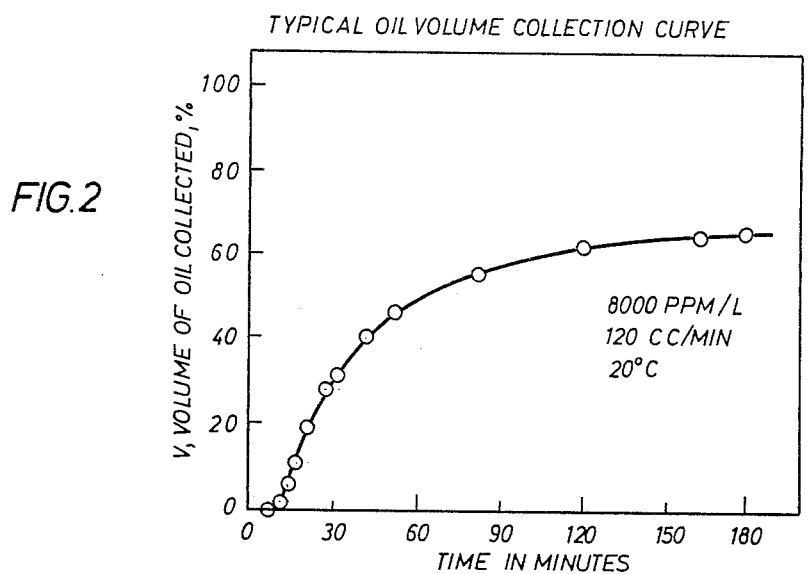
FIG. 2 is a chart illustrating a typical plot of total oil collection against time utilizing the test system of FIG. 1.
Figure 3:
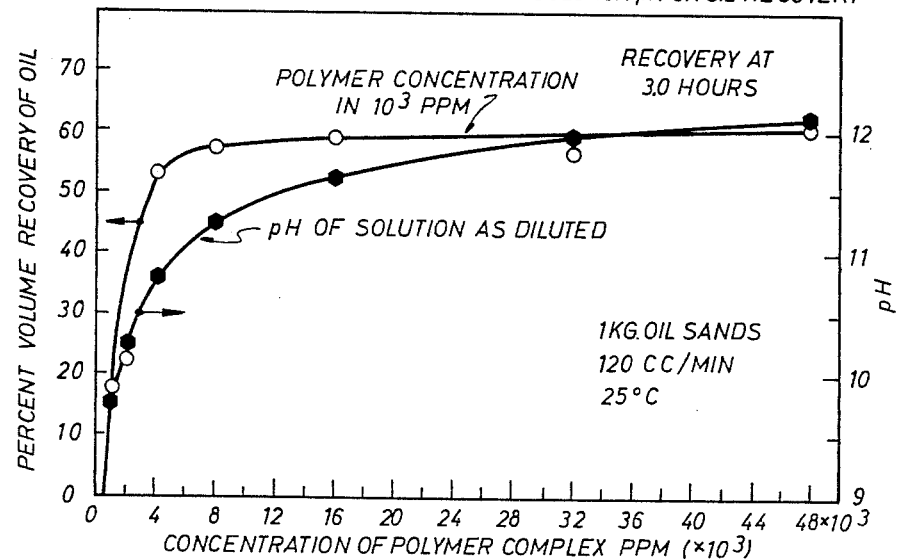
FIG. 3 is a chart illustrating a typical plot of rate of oil release against time for a given polymer concentration in the test system of FIG. 1.
Figure 4:
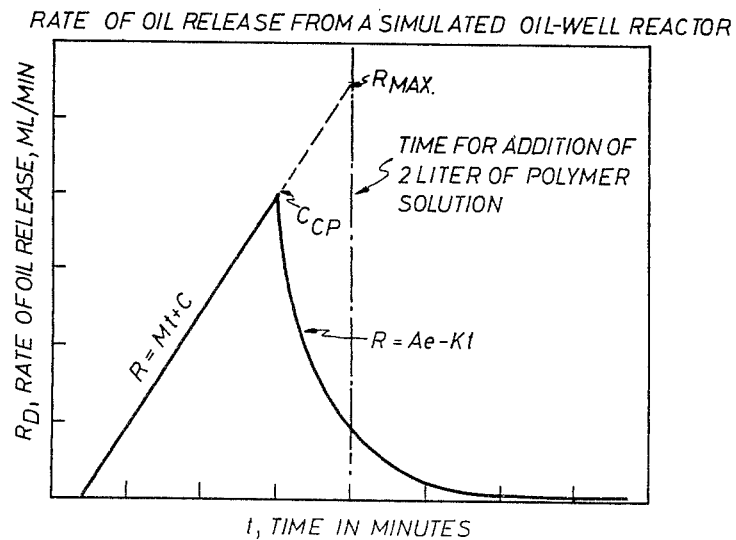
FIG. 4 is a diagrammatic illustration of the effect of polymer concentration and solution pH on oil recovery from the test system of FIG. 1.

While the foregoing and the following description deal primarily with the use of the inorganic polymeric complex to recover oil and gas from underground formations, it should be apparent that the active hydrogen releasing capabilities and other characteristics of the inorganic polymeric complex allow it to be effectively utilized for surface oil separations. In this respect, the inorganic polymeric complexes can be utilized, for example, in more concentrated forms to break emulsions in pits by introducing the aqueous solution of the inorganic polymeric complex, allowing the aqueous solution to react with the emulsion and removing the oil from the broken emulsion. Other applications will become apparent to those working in this and related environments.

the oil-sand bed and the diluted polymeric complex solution placed in a separate container. The polymeric complex solution is then pumped into the reactor at a controlled rate and the amount of oil which floats to the surface of the water layer is collected at succeeding periods of time. A typical collection curve is shown in FIG. 2. A suitable system would include 1.0 Kg of sand, 150 ml of crude oil, 2.0 liters of tap water and 2.0 liters of polymeric complex solution. I have found that most of the collectible oil appears within the space of three hours. By analyzing the rate, R, in ml/min. at which the oil is released from the sand bed and collected, we have determined that two critical factors exist, the polymeric complex concentration in parts per million by weight and the pumping speed of the polymeric complex solution, in milliliters per minute. A typical curve for R vs t (in minutes) is shown in FIG. 4. There are two parts of the curve for R, the rate of oil release. The initial part is linear and is described by the equation: $R = mt + K$, where t is the time in minutes and m and K are constants in the equations. I have shown that R is a function of polymeric complex concentration, C, in parts per million, as well as a function of time, t. At a given concentration, C, the rate of oil release, R, accelerates linearly until some critical point, $C_{pc}$, given in FIG. 4. This point is a particular one in time but since the pumping speed is constant (i.e.—in ml per minute) it actually represents a critical polymeric complex concentration, $C_{pc}$. At this point then, the R curve decays exponentially, according to $R = A \exp -kt$, where A and k are constants. This behavior shows that a reaction does occur between polymeric complex (atomic hydrogen) and crude oil. R, the rate of oil release, accelerates linearly, being pushed by gaseous product formation, until one of the reactants is used up. The R drops exponentially. The values of the R equations are shown in Table I as a function of polymeric complex concentration in solution. Also shown is $R_{max}$, the maximum value R would achieve if the reaction were able to proceed for the full length of time required to add 2,000 ml of polymeric complex solution at a pumping speed of 120 ml/min. (16.67 min). However, it stops at $C_{pc}$ because one of the reacting components is used up.

TABLE I

Critical Constants Determined for Polymeric Complex Concentration Experiments

| Conc (in ppm) | Pumping Speed (ml/min) | $R = mt + C$ | | $R = Ae^{-kt}$ | | $R_{max}$ (ml/min) | $C_{pc}$ (ppm) |
|---|---|---|---|---|---|---|---|
| | | m | k | A | k | | |
| 1000 | 120 cc/min | 0.0037 | −0.07 | 0.102 | −0.00082 | −7.4 × 10⁻¹ | 0.670 |
| 2000 | | 0.11 | −0.86 | 0.782 | −0.0056 | 0.97 | 7,310 |
| 4000 | | 0.58 | −1.86 | 10.97 | −0.046 | 7.81 | 9,800 |
| 8000 | | 0.70 | −1.40 | 6.59 | −0.060 | 10.3 | 11,380 |
| 6000 | | 1.28 | −3.19 | 6.74 | −0.042 | 18.1 | 22,080 |
| 2000 | | 3.00 | −3.08 | 3.24 | −0.050 | 48.4 | 15,190 |
| 8000 | | 2.00 | −3.82 | 2.45 | −0.036 | 29.6 | 40,380 |

Analyses

In order to understand the mechanism of how the polymeric complex inter-reacts with crude oil, I have set up a simulated oil well, using a sand bed containing a known amount of crude oil, as shown in FIG. 1. In this system, crude oil is mixed with a known amount of sand and placed in the reactor. A surface layer of brine (3.2% NaCl by weight) or tap water is placed over the top of It is also easily determined that $C_{pc}$ given in Table I is fairly constant up to a value between 8,000 and 16,000 ppm. The value given for 2,000 ppm cannot be considered comparable since it involves a different batch of polymeric complex. Therefore, our calculated value for $C_{pc}$ has an error of about 10% up to about 12,000 ppm polymeric complex concentration. The values of $C_{pc}$ for the higher concentrations indicate some sort of coalescence. It is for this reason that I prefer to use the lower concentrations for the recovery of crude oil.

Equally important is the evaluation of the reaction occurring between the crude oil and the aqueous inorganic polymeric complex solution as a function of the pumping speed as shown in Table II. The concentration was held constant at 16,000 ppm and the pumping speed was varied in milliliters per minute.

TABLE II

Critical Constants Determined for Pumping Speed Experiments

| Conc (ppm/l) | Pumping Speed (ml/min) | $R = mt + C$ | | $R = Ae^{-kt}$ | | $R_{max}$ (ml/min) | $C_{pc}$ (ppm) |
|---|---|---|---|---|---|---|---|
| | | m | C | A | k | | |
| 16,000 | 30 | .292 | −2.32 | 7.74 | $-3.5 \times 10^{-2}$ | 17.2 | 10,800 |
| | 60 | 1.44 | −4.43 | 7.66 | $-6.2 \times 10^{-2}$ | 43.6 | 11,520 |
| | 120 | 2.32 | −2.34 | 14.1 | $-1.2 \times 10^{-2}$ | 36.3 | 10,100 |
| | 240 | 4.29 | −4.28 | 12.1 | $-1.4 \times 10^{-2}$ | 31.5 | 12,060 |

Again, it is easy to see that R, the rate of oil release, is a linear function of the pumping speed. Furthermore, the critical polymeric complex concentration, $C_{pc}$, required for completion of the reaction is remarkably constant, even more so than the values of Table I for the same constant. However, $R_{max}$ seems to vary considerably more and no relation to pumping speed can be discerned.

When the values of R given in terms of time, t, in Table III are converted to values of concentration in ppm, it is found that a single curve of R vs ppm contains nearly all of the experimental points. It can thus be concluded that it is not the pumping speed in milliliters per minute that is important but ppm of polymeric complex per minute reaching the crude oil components so that a reaction can take place.

Even more indicative are gas chromatographs taken of the crude oil before and after reaction. A gas chromatograph is an instrument fitted with a separation column, temperature control and a suitable detector. Crude oils are composed of many hydrocarbon components, each of which has a well defined boiling point. If a small sample of crude oil is injected into the separation column and the temperature increased linearly, the components can be separated and detected. A detector sensitive only to hydrocarbons is required. The resulting graph consists of a large number of sharp peaks, each of which represents a specific type of compound or compounds. By integrating the area under the peaks, summing them, and then following the ASTM-D2887-73 procedure, one can obtain a median boiling point (B.P.) characteristic for the particular crude oil. This is a standard method developed by ASTM (American Society of Testing Methods, Inc., Philadelphia, Pa.).

FIG. 5 shows a gas chromatograph for a crude oil from Arkansas. The median B.P. is 310.5° C. In the accompanying table, the percent of the peak fractions have been summed according to their retention temperature in the chromatographic column. A reaction between inorganic polymeric complex and a sample of this crude oil was carried out in a closed container fitted with a septum. The reaction was run at ambient (room) temperature. The oil sand was placed in the vial, covered with polymeric complex, tap water added, the vial sealed, shaken gently, and the mixture allowed to stand about 15 minutes. The crude oil remaining in the vial gave a gas chromatographic pattern as shown in FIG. 6. It is easy to see that the low boiling fractions are absent and the median B.P. is 372.4° C., a change of 61.9° C. The polymeric complex concentration required to effect this change was 50,000 ppm. When the "headspace" above the liquid-air interface was sampled, I found that hydrocarbon gases were present whose median B.P. is close to 90° C. Thus there can be little doubt that the inorganic polymeric complex, through the release of active hydrogen, reacts with crude oil to produce gaseous products.

I have found that the intensity of the peaks of the low boiling fractions decrease with increasing polymer concentration. At 8,000 ppm, there is a larger fraction of low boiling components left in the crude oil than at 16,000 ppm. And at 50,000 ppm, nearly all of the low boiling fractions are gone.

Table III shows the results of a series of experiments using Arkansas Crude oil and varying the polymer concentration and temperature of mixing. At room temperature mixing, it appears that the lower concentration of polymer (5000 ppm) produced more "lights" ($C_5$ to $C_{11}$) than in the case of the more concentrated polymer (50,000 ppm). More "mediums" ($C_{12}$ to 27) were produced at the higher concentration than at the lower concentration. Similar results were obtained with the series at a mixing temperature of 82° C., i.e.—more "lights" at lower concentration of polymer. The only apparent difference at the higher temperature was that the "lights" produced were in the $C_5$ to $C_{10}$ region.

TABLE III

| Area % | Untreated Ark. Crude 53-0 | 5000 ppm RT Treated Oil 53-1A | 50,000 ppm RT Treated Oil 53-1B | 5000 ppm 82° C. Treated Oil 53-4A | 50,000 ppm 82° C. Treated Oil 53-4B |
|---|---|---|---|---|---|
| $C_4$ | 0.01 | 0 | 0 | 0 | 0 |
| $C_5$ | 2.35 | 0.44 | 0 | 0.08 | 0 |
| $C_6$ | 6.50 | 7.42 | 3.84 | 0.40 | 0.10 |
| $C_7$ | 20.47 | 9.92 | 6.84 | 12.53 | 2.56 |
| $C_8$ | — | 4.44 | 2.86 | — | 2.54 |
| $C_9$ | 33.45 | 25.08 | 16.09 | 34.14 | 18.36 |
| $C_{10}$ | 8.75 | 8.21 | 9.61 | 17.76 | 10.62 |
| $C_{11}$ | 3.26 | 1.74 | 1.50 | 3.83 | 7.49 |
| $C_{12}$ | 4.33 | 7.28 | 10.11 | 5.20 | 7.87 |
| $C_{13}$ | 3.50 | 5.29 | 8.27 | 4.27 | 7.41 |
| $C_{14}$ | 3.48 | 5.96 | 8.44 | 4.48 | 8.51 |
| $C_{15}$ | 1.71 | 4.30 | 4.09 | 2.21 | 4.08 |

TABLE III-continued

| Area % | Untreated Ark. Crude 53-0 | 5000 ppm RT Treated Oil 53-1A | 50,000 ppm RT Treated Oil 53-1B | 5000 ppm 82° C. Treated Oil 53-4A | 50,000 ppm 82° C. Treated Oil 53-4B |
|---|---|---|---|---|---|
| $C_{16}$ | 2.98 | 4.99 | 7.34 | 3.90 | 7.68 |
| $C_{17}$ | 2.72 | 4.58 | 6.85 | 3.58 | 7.08 |
| $C_{18}$ | 1.62 | 2.53 | 4.03 | 2.00 | 3.99 |
| $C_{19}$ | 1.20 | 1.85 | 2.77 | 1.41 | 2.83 |
| $C_{20}$ | 1.00 | 1.64 | 2.23 | 1.17 | 2.55 |
| $C_{21}$ | 0.75 | 1.26 | 1.46 | 0.76 | 1.55 |
| $C_{22}$ | 0.50 | 0.72 | 0.97 | 0.61 | 1.16 |
| $C_{23}$ | 0.41 | 1.09 | 1.03 | 0.46 | 1.01 |
| $C_{24}$ | 0.35 | 0.50 | 0.82 | 0.45 | 0.96 |
| $C_{25}$ | 0.43 | 0.53 | 0.65 | 0.44 | 0.93 |
| $C_{26}$ | 0.23 | 0.26 | 0.27 | 0.25 | 0.52 |
| $C_{27}$ | 0.10 | 0.10 | 0 | 0.16 | 0.25 |

The presence of silt also appears to affect the median B.P. obtained and in some cases increases the formation of gaseous products. These tests were carried out in the simulated oil well test and the resulting oil analyzed by gas chromatography. The data are given in Table IV.

TABLE IV

Effect of Silt on Median B.P. (Arkansas Crude)

| % Silt Added (by weight) | Median B.P. (8,000 ppm - 120 cc/min - 20° C.) |
|---|---|
| 0.0 | 315.2° C. |
| 0.5 | 318.5° C. |
| 1.0 | 316.7° C. |
| 5.0 | 321.9° C. |
| Untreated Crude | 310.5° C. |

It is easy to recognize that when the median B.P. of the treated crude oil rises, it is due to a lower content of low boiling fractions in the treated crude oil. These gas chromatographic results indicate that still another factor, the presence of silt, does affect the reaction between hydrogen-bearing inorganic polymeric complex and low boiling fractions of the crude. I have also found that the degree and type of reaction incurred seems to be a function of the type of crude oil encountered.

For example, one can arbitrarily divide up the peaks of a typical gas chromatograph into: (1) lights (up to 175° C.), (2) mediums (175° C. to 350° C.), (3) heavies (350° C. and above). For certain Kansas crude oil, I have observed the creation of mediums from lights, whereas, for a Loudon crude from Texas, both lights and heavies have been observed to form mediums, that is, both ends of the distribution of hydrocarbon compound fractions tended to move toward the center after reaction with the polymer. In another case involving a West Virginia crude oil whose median B.P. was 323.5° C., heavies gave rise to both lights and mediums, and the median B.P. of the reacted crude was then 211.7° C. For a different West Virginia crude oil (Median B.P. was 160.2° C.), I also observed lights producing mediums and heavies, the treated oil now having a median B.P. of 230.8° C. However, in all cases, significant quantities of gases were produced. It is important to the invention that in all cases, release of atomic hydrogen by the inorganic polymeric complex produces hydrocarbon gases by reaction with lights, mediums, and/or heavies, depending upon the nature of the crude oil encountered.

Although I have described but a limited number of methods for producing "bottom hole pressure" in depleted oil wells so as to recover crude oils from formations previously considered as depleted, it will be apparent to those skilled in the art that variations in both methods and compositions may be effected while yet remaining within the spirit of the invention. For example, where I have described treatment of only a single well, it should be apparent that a group of wells, such as the "five spot" arrangement, may be used in an effort to maximize oil production. In such an arrangement the middle "spot" well may be used for injection and the four corner wells for production. Alternatively, one or more of the corner wells may be used as injection wells, with the center well becoming the producer. It is my intent not to be limited by the disclosure I have here provided, but to have the claims I now submit interpreted to the fullest scope permissible.

What is claimed is:

1. Method of recovering petroleum values from subterranean formations which comprises:

contacting at least a portion of the petroleum within the formation with an effective amount of an aqueous solution of a polymeric complex capable of releasing active hydrogen under the temperature and pressure conditions of the formation in a manner and for a time sufficient to permit the active hydrogen released by the polymeric complex to react with the petroleum within the formation, whereby low molecular weight hydrocarbons are produced in situ, generating an increased formation pressure adequate to produce petroleum values from at least one well drilled into said formation.

2. The method of claim 1 wherein the aqueous solution of polymeric complex is brought into contact with the petroleum within the subterranean formation by introducing quantities of said aqueous solution into said formation through an injection well drilled into said formation.

3. The method of claim 2 wherein the concentration of polymeric complex in the aqueous solution is within the range from about 400 ppm to about 100,000 ppm, by weight.

4. The method of claim 2 wherein the concentration of polymeric complex in the aqueous solution is within the range of about 4,000 to about 48,000 ppm, by weight.

5. The method of claim 1 said aqueous solution of polymeric complex contains a minor amount of hydrogen peroxide.

6. The method of enhancing recovery of petroleum values from subterranean formations having relatively low formation bottomhole pressures which comprises:

contacting the petroleum within the formation with an effective amount of a polymeric complex material capable of releasing active hydrogen under the temperature and pressure conditions existing within the formation and, thereafter, sealing in said formation for a time period sufficient to permit reaction of the active hydrogen released by said polymeric complex material with the petroleum within the formation and the resultant generation of sufficient pressure within said formation to enable increased production from at least one well drilled into said formation.

7. The method of claim 6 wherein the polymeric complex comprises an inorganic multi-metal polymeric complex consisting essentially of a polymer having the following repeated structure:

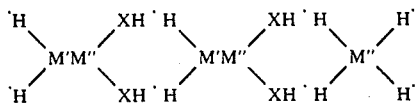

Wherein
M' is sodium or potassium, and
M" is silicon or aluminum, and
X is selected from nitrogen, phosphorus or sulfur.

8. The method of claim 7 wherein the inorganic polymeric complex is diluted with water prior to injection into the formation to produce an effective concentration of inorganic polymeric complex within the formation of from about 400 to about 100,000 ppm, by weight.

9. The method of claim 7 wherein the inorganic polymeric complex is diluted with water prior to injection into the formation to produce an effective concentration of inorganic polymeric complex within the formation of from about 4,000 to about 48,000 ppm, by weight.

10. The method of claim 7 wherein M" is silicon.

11. The method of claim 10 wherein the ratio of silicon to sodium or potassium in said inorganic polymeric complex is at least 1.4:1.

12. The method of claim 11 wherein said ratio is at least 2:1.

13. The method of claim 8 wherein the inorganic polymeric complex diluted with water includes a minor amount of hydrogen peroxide.

14. The method of improving the production of crude petroleum values from a petroleum bearing formation which comprises:

injecting through at least one well drilled into said formation an effective amount of an inorganic polymeric complex consisting essentially of a polymer having the following repeated structure:

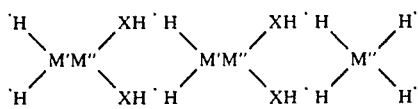

Wherein
M' is sodium or potassium,
M" is silicon or aluminum, and
X is selected from nitrogen, phosphorus or sulfur
in dilute aqueous solution sufficient to produce a concentration of said inorganic polymeric complex within the formation between about 400 to 100,000 ppm, by weight;
in a manner sufficient to maintain the pH of said aqueous solution above about 11.5 during the injection and when the solution reaches the oil bearing reservoir within said formation;

shutting in the injection well and any other wells drilled into said formation until sufficient pressure has been generated within the formation to improve the rate of production of petroleum values therefrom, and producing from at least one well drilled into said formation according to appropriate recovery procedures.

* * * * *